United States Patent
Furuta et al.

(10) Patent No.: US 9,950,378 B2
(45) Date of Patent: Apr. 24, 2018

(54) WIRE ELECTRIC DISCHARGE MACHINE

(71) Applicant: FANUC Corporation, Yamanashi (JP)

(72) Inventors: Tomoyuki Furuta, Yamanashi (JP); Shinji Yoda, Yamanashi (JP); Akiyoshi Kawahara, Yamanashi (JP); Yasuo Nakashima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 47 days.

(21) Appl. No.: 15/088,186

(22) Filed: Apr. 1, 2016

(65) Prior Publication Data
US 2016/0288230 A1 Oct. 6, 2016

(30) Foreign Application Priority Data

Apr. 2, 2015 (JP) ................................ 2015-075849
Jan. 6, 2016 (JP) ................................ 2016-001244

(51) Int. Cl.
*B23H 7/00* (2006.01)
*B23H 1/02* (2006.01)
(Continued)

(52) U.S. Cl.
CPC ............... *B23H 1/02* (2013.01); *B23H 1/024* (2013.01); *B23H 1/04* (2013.01); *B23H 7/04* (2013.01)

(58) Field of Classification Search
CPC . B23H 1/02; B23H 1/024; B23H 1/04; B23H 7/04
(Continued)

(56) References Cited

U.S. PATENT DOCUMENTS 4,695,696 A 9/1987 Ozaki et al.
4,963,711 A 10/1990 Obara
(Continued)

FOREIGN PATENT DOCUMENTS

CN 1765572 A 5/2006
CN 101065209 A 10/2007
(Continued)

OTHER PUBLICATIONS

Partial European Search Report in EP Application No. 16163268.2, dated Sep. 5, 2016.
(Continued)

*Primary Examiner* — Thien S Tran
(74) *Attorney, Agent, or Firm* — Hauptman Ham, LLP

(57) ABSTRACT

In a wire electric discharge machine, a discharge delay time is used to classify the inter-electrode state into three categories; a short-circuit state, small-gap state, and large-gap state. Based on this classification, the magnitude of a machining current supplied from a main discharge circuit is determined. If the discharge delay time is zero (i.e., if no electric discharge is generated) after the lapse of a predetermined time since the start of the application of a machining voltage to an inter-electrode gap by an auxiliary discharge circuit, the inter-electrode gap is determined to be short-circuited by machining chips. Thereupon, a short-circuit machining current is supplied from the main discharge circuit to the inter-electrode gap to remove the machining chips. In this way, establishment of a complete short-circuit state is prevented so that the machining efficiency is improved to increase the machining speed.

12 Claims, 7 Drawing Sheets

(51) Int. Cl.
*B23H 1/04* (2006.01)
*B23H 7/04* (2006.01)

(58) Field of Classification Search
USPC .................. 219/69.12, 69.13, 69.17, 69.19
See application file for complete search history.

(56) References Cited

U.S. PATENT DOCUMENTS

| | | | |
|---|---|---|---|
| 5,306,888 | A | 4/1994 | Kaneko et al. |
| 5,864,213 | A | 1/1999 | Kinbara |
| 2005/0051519 | A1* | 3/2005 | Satou ............... B23H 7/04 219/69.12 |
| 2006/0108328 | A1 | 5/2006 | Luo et al. |
| 2007/0289949 | A1 | 12/2007 | Suzuki et al. |
| 2008/0110865 | A1* | 5/2008 | Hashimoto ............ B23H 7/04 219/69.12 |
| 2009/0314747 | A1 | 12/2009 | Hashimoto et al. |
| 2015/0283635 | A1 | 10/2015 | Onodera et al. |

FOREIGN PATENT DOCUMENTS

| | | |
|---|---|---|
| CN | 100413645 C | 8/2008 |
| CN | 101257991 A | 9/2008 |
| CN | 101905360 A | 12/2010 |
| CN | 103240474 A | 8/2013 |
| EP | 1658915 A2 | 5/2006 |
| EP | 2269755 A2 | 1/2011 |
| JP | S58-211826 A | 12/1983 |
| JP | S60-29230 A | 2/1985 |
| JP | S62-152616 A | 7/1987 |
| JP | H01-121127 A | 5/1989 |
| JP | H05-69230 A | 3/1993 |
| JP | H05-177436 A | 7/1993 |
| JP | H07-60548 A | 3/1995 |
| JP | 7-156019 A | 6/1995 |
| JP | H07-171716 A | 7/1995 |
| JP | H10-315052 A | 12/1998 |
| JP | 2002-36030 A | 2/2002 |
| JP | 2002036030 A * | 2/2002 |
| JP | 2004-50298 A | 2/2004 |
| JP | 2010-280046 A | 12/2010 |
| JP | 5510616 B1 | 6/2014 |
| WO | 89/11371 A1 | 11/1989 |
| WO | 9301017 A1 | 1/1993 |
| WO | 03/089175 A1 | 10/2003 |
| WO | 2007032114 A1 | 3/2007 |
| WO | 2008050404 A1 | 5/2008 |

OTHER PUBLICATIONS

Office Action in JP Application No. 2016-001244, dated Aug. 2, 2016.
Extended European Search Report in EP Application No. 17179488.6, dated Oct. 17, 2017, 10 pp.
Mu-Tian Yan et al, "Monitoring and control of the micro wire-EDM process", International Journal of Machine Tools & Manufacture, Oct. 9, 2006, pp. 148-157, vol. 47, No. I, Pergamon Press, Oxford, Great Britain, 10 pp.
Office Action in CN Application No. 201610206131.4, dated Sep. 19, 2017, 12pp.

* cited by examiner

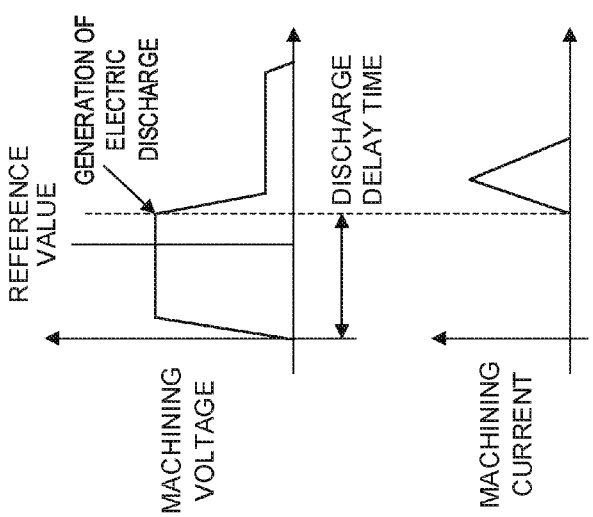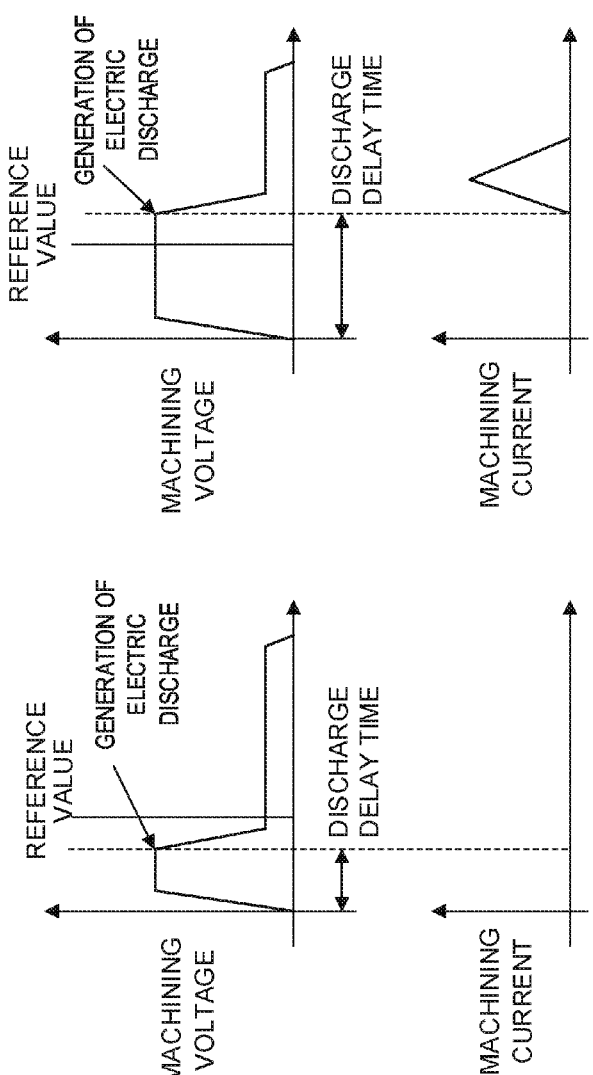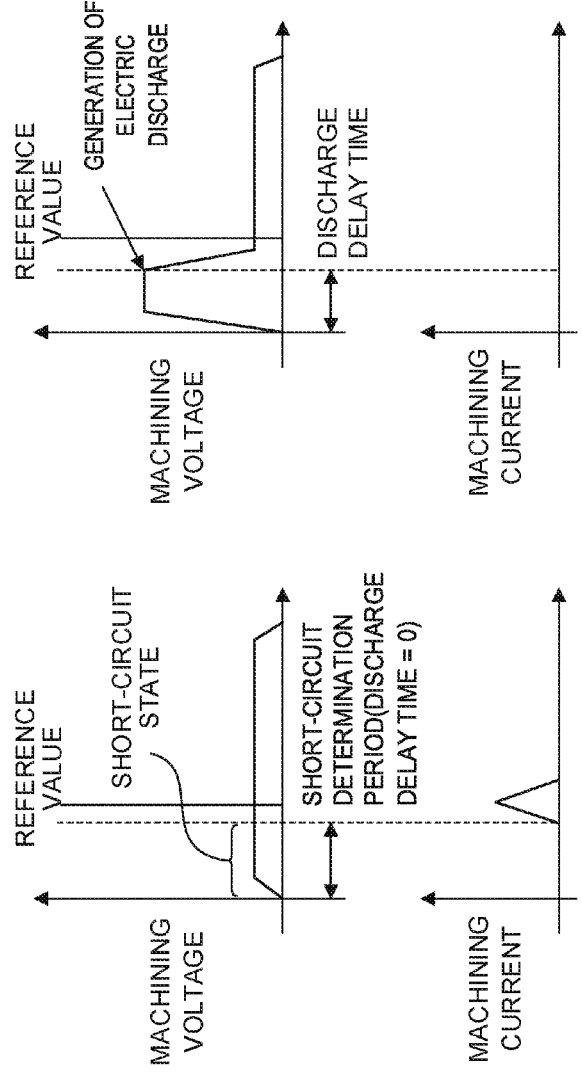

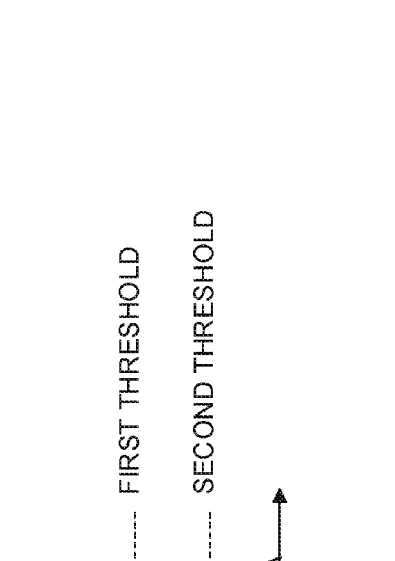
FIG.4A
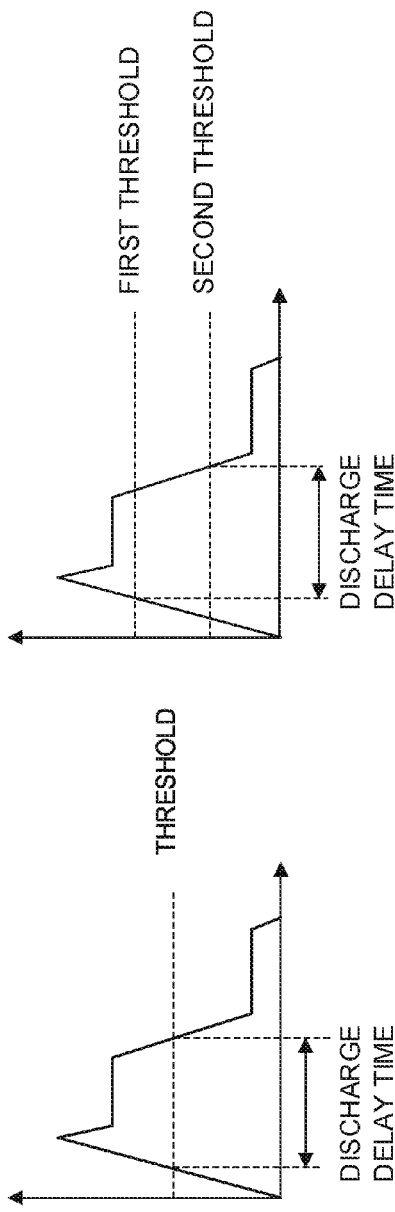
FIG.4B
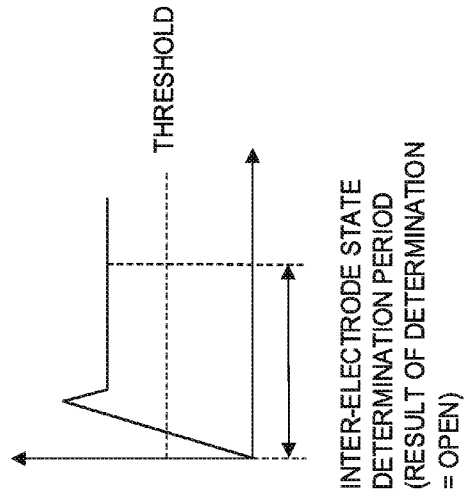
FIG.5C
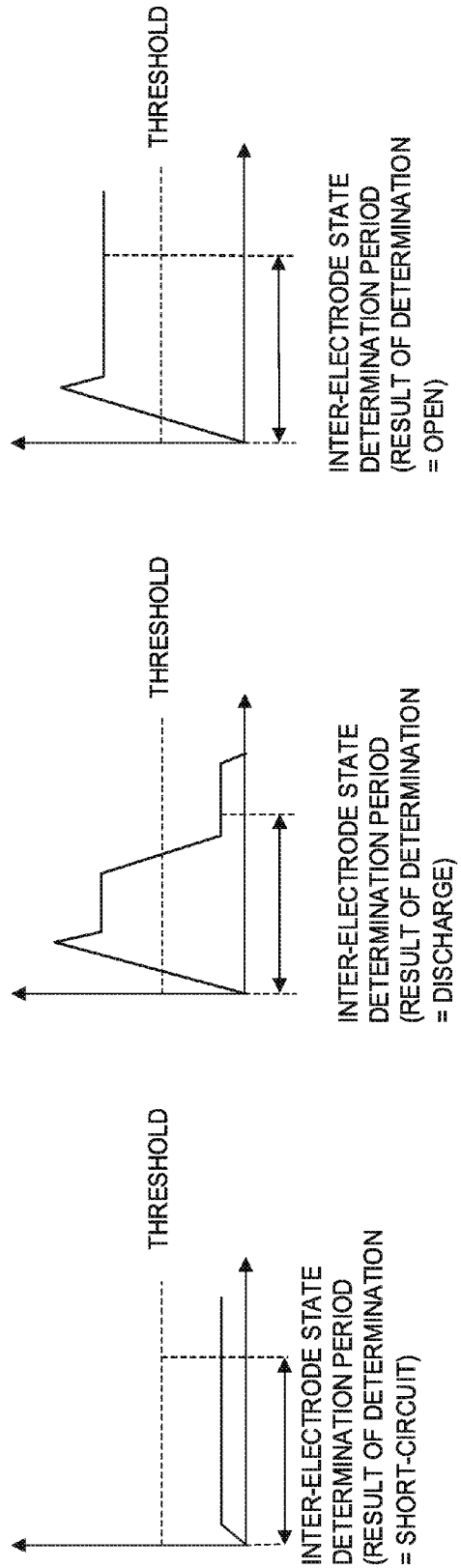
FIG.5B
FIG.5A

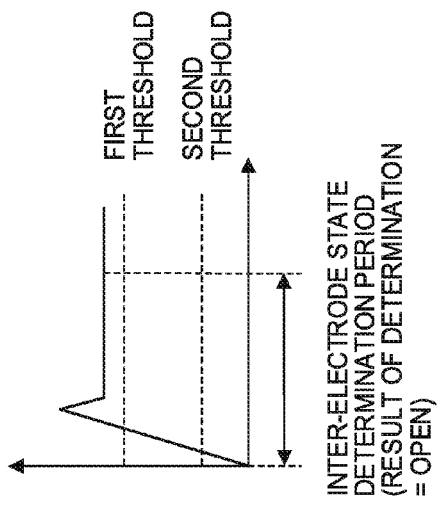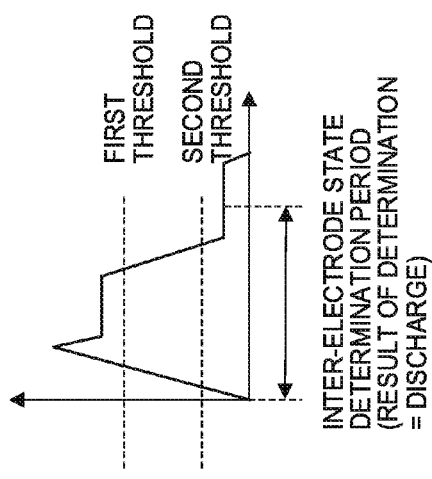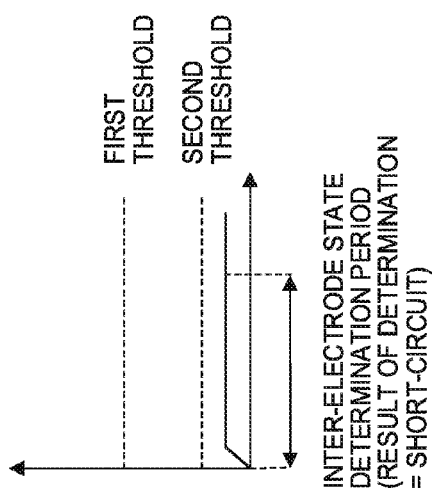

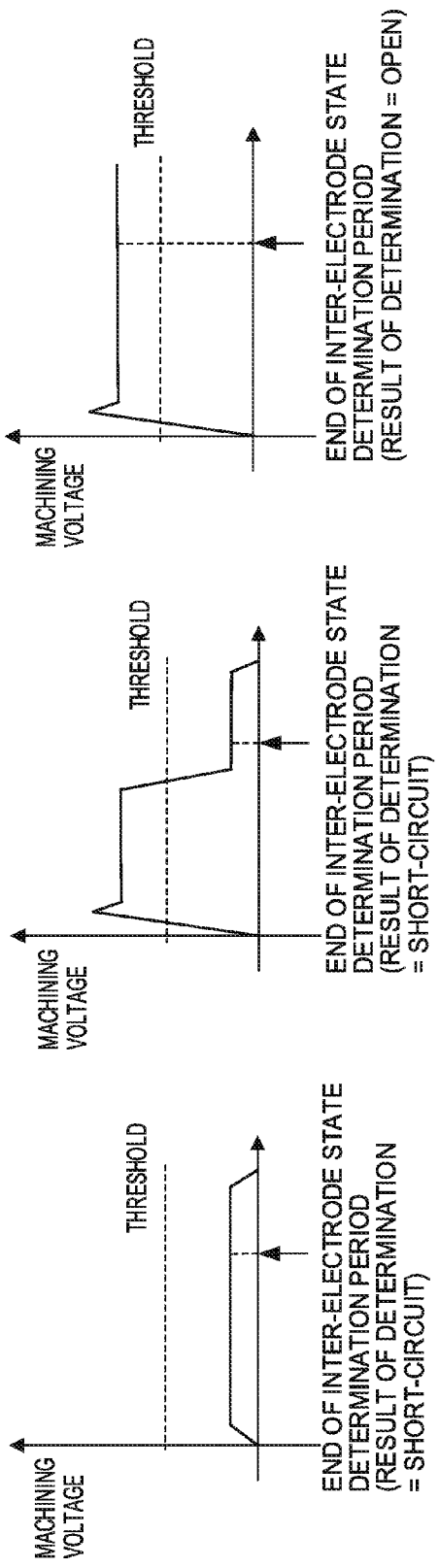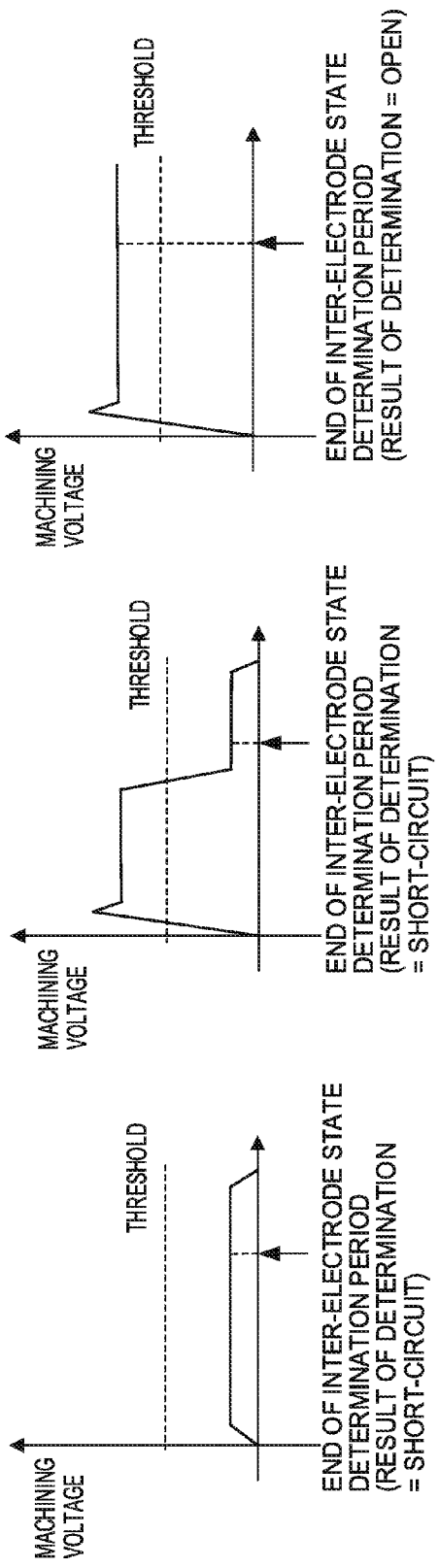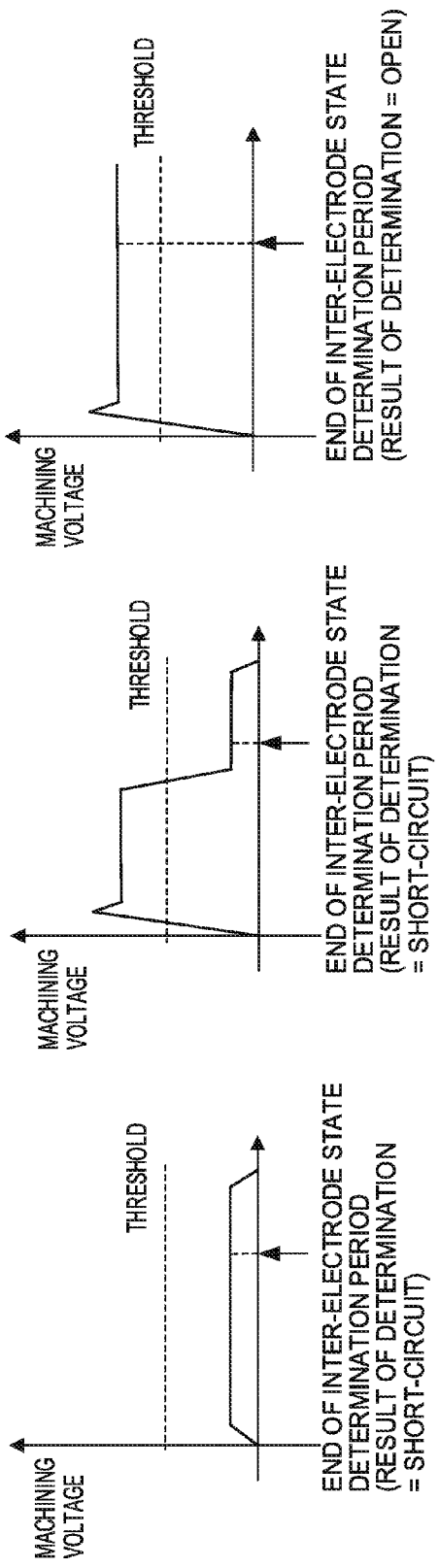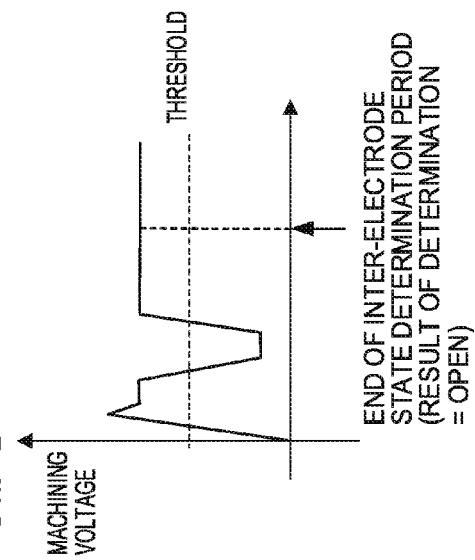

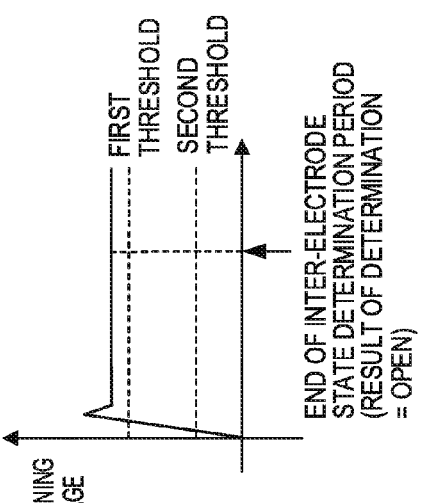
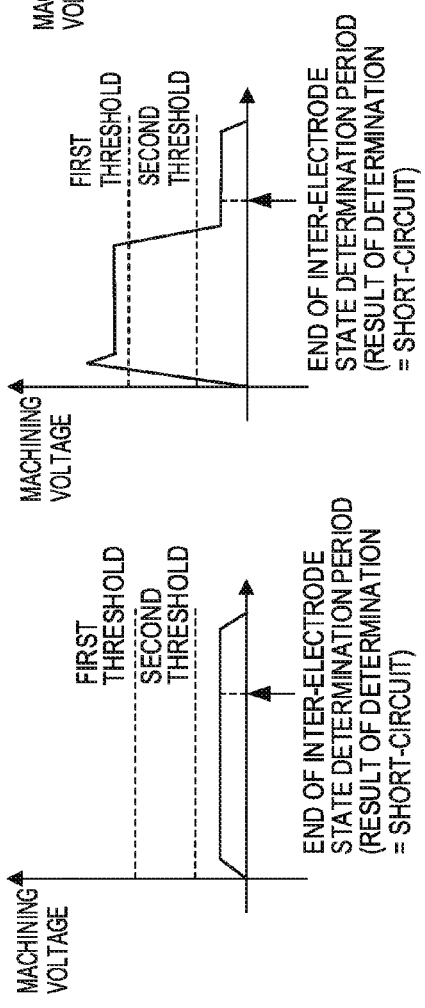
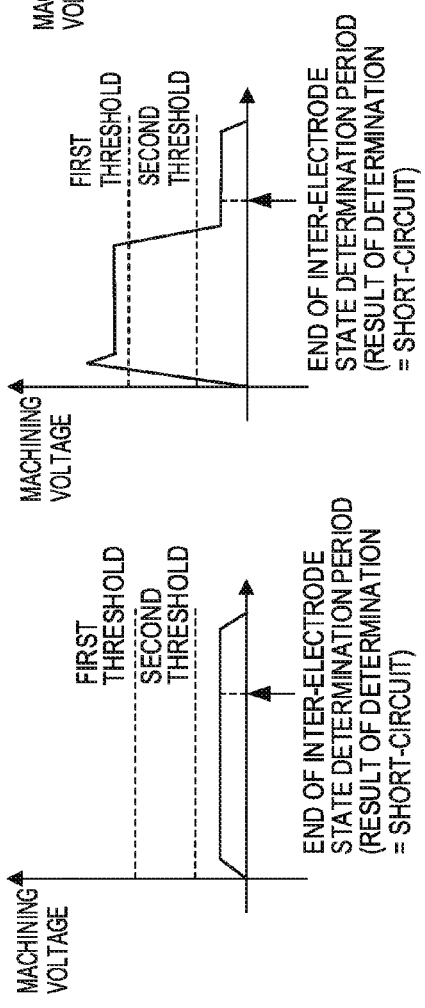
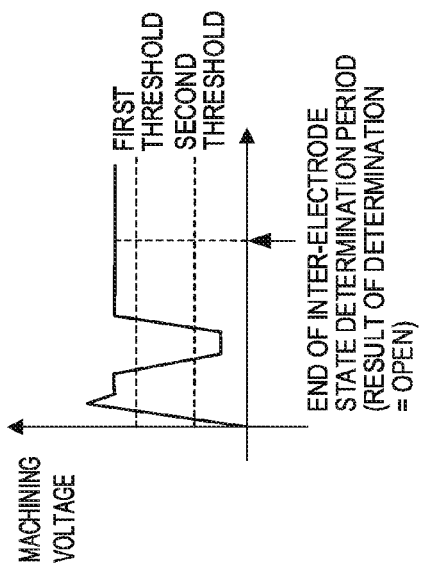

WIRE ELECTRIC DISCHARGE MACHINE

RELATED APPLICATIONS

The present application claims priority to Japanese Application Number 2015-075849, filed on Apr. 2, 2015, and Japanese Application Number 2016-001244, filed on Jan. 6, 2016, the disclosures of which are hereby incorporated by reference herein in their entireties.

BACKGROUND OF THE INVENTION

Field of the Invention

The present invention relates to a wire electric discharge machine.

Description of the Related Art

When electric discharge machining is performed using a wire electric discharge machine, the shape of a machined surface is substantially similar to a transcription of the shape of a wire. Basically, the greater the distance between upper and lower guides, the larger the amount of deflection in the central portion of the wire is. The greater the plate thickness, therefore, the lower the straightness accuracy of the machined surface tends to be.

Methods to solve this problem are described in Japanese Patent Applications Laid-Open Nos. 62-152616, 1-121127, 7-171716, 7-60548, 2004-50298, WO93/01017, WO2007/032114, and WO2008/050404. According to these methods, machining currents flowing through upper and lower conductors are measured by means of an inductor, such as a coil, and a discharge position is calculated based on the ratio between the measured currents. In this way, reduction in shape accuracy, as well as wire breakage, due to discharge concentration, can be prevented. In a similar method described in Japanese Patent Application Laid-Open No. 60-29230, moreover, the same effect is obtained by using a dividing resistor in place of the inductor.

If the plate thickness of a workpiece increases, furthermore, the amount of deflection of the central portion of the wire increases, in particular, so that the amount of a gap (inter-electrode gap) between the wire and the workpiece is reduced. In the prior art, if the machining voltage is increased even momentarily, the state of the inter-electrode gap is determined to be satisfactory, and a high machining current is applied in every electric discharge without regard to a discharge delay time. Consequently, the central portion of the workpiece, in which electric discharge with a short discharge delay time is frequently generated, is excessively machined. Thus, the greater the plate thickness, the lower the straightness accuracy tends to be.

Thereupon, an experiment according to the present invention revealed that the straightness accuracy of a workpiece can be improved by taking advantage of the discharge delay time that is correlated with the inter-electrode gap. Specifically, if the discharge delay time is less than a predetermined value, the amount of machining at the central portion of the plate thickness can be reduced by making the machining current lower than a normal value or by applying no machining current.

Described in Japanese Patent Application Laid-Open No. 58-211826 is a prior art technique that is based on the same discharge delay time as in the present invention, although the object of the prior invention, unlike that of the present invention, is to prevent wire breakage. According to this technique, a current lower than a normal current is supplied to prevent breakage with a narrow inter-electrode gap if the discharge delay time is less than a predetermined value.

Described in Japanese Patent Application Laid-Open No. 10-315052 is a method in which a measured discharge delay time less than a predetermined value is determined to be abnormal and the application of a machining current by a main discharge circuit is interrupted, in order to prevent wire breakage if immediate discharge or the like is generated due to a worsened machining state.

Described in Japanese Patent No. 5510616 is a technique for preventing wire breakage by reducing the time of machining current application, interrupting the application, or inserting a down time if the discharge delay time is less than a predetermined value.

Described in Japanese Patent Applications Laid-Open Nos. 5-177436 and 5-69230 are methods in which the time of machining current application is set in proportion to the discharge delay time in order to prevent breakage due to the machining current application depending on the inter-electrode state.

In the methods described in Japanese Patent Applications Laid-Open Nos. 62-152616, 1-121127, 7-171716, 7-60548, 2004-50298, WO93/01017, WO2007/032114, WO2008/050404, and 60-29230, reduction in shape accuracy, as well as wire breakage, due to discharge concentration, is prevented by detecting the discharge position by means of the coil or the dividing resistor. These methods require the use of a detection circuit composed of the coil or the dividing resistor and an analog circuit for processing analog signals output from the detection circuit. Thus, there is a problem that the configuration is complicated and expensive and a method is needed to correct errors in the detection circuit and the analog circuit.

If the methods described in Japanese Patent Applications Laid-Open Nos. 58-211826, 10-315052, 5-177436, and 5-69230 and Japanese Patent No. 5510616 are used to make an appropriate adjustment for the improvement in straightness accuracy in thick-plate machining, it can be expected that the straightness accuracy in the thick-plate machining can be improved to some extent, in addition to the prevention of wire breakage as a primary object.

If the discharge delay time is zero, that is, in case of a short-circuit state, however, the machining current should not always be reduced. In other words, the discharge delay time becomes zero if the inter-electrode gap is short-circuited by machining chips suspended in the inter-electrode gap so that the machining voltage cannot increase. In such a situation, the machining current should be positively applied to remove the machining chips in the inter-electrode gap. If the machining current is not applied or is reduced, in contrast, the machining chips in the inter-electrode gap cannot be removed, so that the wire and the workpiece are brought into contact with each other, thereby causing a complete short-circuit state. As a result, the relative position of the wire and the workpiece is expected be shifted to widen the inter-electrode stance and cancel the short-circuit state. Since it takes time to cancel the short-circuit state, the machining time is prolonged, and at the worst, no or only a low machining current is applied due to the short-circuit state. Consequently, the short-circuit state cannot be canceled, so that the machining operation is stopped inevitably.

SUMMARY OF THE INVENTION

Accordingly, the object of the present invention is to provide a wire electric discharge machine having the function of improving the straightness accuracy of a thick workpiece and canceling short-circuiting caused by machining chips, thereby improving the machining efficiency and hence increasing the machining speed.

Embodiment Mode 1 of the present invention is a wire electric discharge machine, which comprises an auxiliary discharge circuit, configured to apply a voltage to an inter-electrode gap between an electrode and a workpiece, thereby inducing electric discharge, and a main discharge circuit configured to supply a machining current, and machines the workpiece by repeating a cycle in which the main discharge circuit is activated and stopped after the auxiliary discharge circuit is activated. The wire electric discharge machine comprises discharge delay time measuring means configured to measure a discharge delay time, which is a duration without electric discharge such that the machining voltage is applied from the auxiliary discharge circuit to the inter-electrode gap. A short-circuit machining current is supplied from the main discharge circuit to the inter-electrode gap if the result of measurement by the discharge delay time measuring means is zero after the lapse of a predetermined short-circuit determination period since the start of the application of the machining voltage to the inter-electrode gap by the auxiliary discharge circuit. No machining current is supplied from the main discharge circuit to the inter-electrode gap or a machining current lower than or equal to the short-circuit machining current is supplied when electric discharge is generated and if the discharge delay time is less than a reference value, despite the short-circuit determination period. A normal machining current equal to or higher than the short-circuit machining current is supplied from the main discharge circuit to the inter-electrode gap when electric discharge is generated and if the discharge delay time is not less than the reference value, despite the short-circuit determination period.

Embodiment Mode 2 of the invention, based on Embodiment Mode 1 of the invention, is a wire electric discharge machine in which the discharge delay time measuring means measures a duration in which the absolute value of an inter-electrode machining voltage waveform is not lower than a threshold. Embodiment Mode 3 of the invention, based on Embodiment Mode 1 of the invention, is a wire electric discharge machine in which the discharge delay time measuring means measures a duration in which the absolute value of an inter-electrode machining voltage waveform having exceeded a first threshold falls below a second threshold.

Embodiment Mode 4 of the invention, based on Embodiment Mode 1 or 2 of the invention, is a wire electric discharge machine in which means for detecting generation of the electric discharge detects the electric discharge when the absolute value of the inter-electrode machining voltage waveform having exceeded a threshold falls below the threshold.

Embodiment Mode 5 of the invention, based on any one of Embodiment Modes 1 to 3 of the invention, is a wire electric discharge machine in which means for detecting generation of the electric discharge detects the electric discharge when the absolute value of the inter-electrode machining voltage waveform having exceeded a first threshold falls below a second threshold.

Embodiment Mode 6 of the invention, based on any one of Embodiment Modes 1 to 3 of the invention, is a wire electric discharge machine in which means for detecting generation of the electric discharge detects the electric discharge if the discharge delay time output from the discharge delay time measuring means is more than zero and does not change for a predetermined time or if the amount of change during the predetermined time is not higher than a tolerance.

Embodiment Mode 7 of the present invention is a wire electric discharge machine, which comprises an auxiliary discharge circuit, configured to apply a voltage to an inter-electrode gap between an electrode and a workpiece, thereby inducing electric discharge, and a main discharge circuit configured to supply a machining current, and machines the workpiece by repeating a cycle in which the main discharge circuit is activated and stopped after the auxiliary discharge circuit is activated. This wire electric discharge machine comprises inter-electrode state determination means configured to output an open, discharge, or short-circuit signal, depending on an inter-electrode state during a predetermined inter-electrode state determination period, after the application of the machining voltage from the auxiliary discharge circuit to the inter-electrode gap is started. A short-circuit machining current is supplied from the main discharge circuit to the inter-electrode gap if the short-circuit signal is output from the inter-electrode state determination means. No machining current is supplied from the main discharge circuit to the inter-electrode gap or a machining current lower than or equal to the short-circuit machining current is supplied if the discharge signal is output from the inter-electrode state determination means. The application of the machining voltage from the auxiliary discharge circuit to the inter-electrode gap is continued if the open signal is output from the inter-electrode state determination means. A normal machining current equal to or higher than the short-circuit machining current is supplied from the main discharge circuit to the inter-electrode gap if electric discharge is generated after the inter-electrode state determination period.

Embodiment Mode 8 of the invention, based on Embodiment Mode 6 of the invention, is a wire electric discharge machine in which the inter-electrode state determination means determines the inter-electrode state in such a method that the absolute value of an inter-electrode machining voltage waveform and a threshold are compared during the inter-electrode state determination period, a short-circuit mode is identified if the waveform is always less than the threshold, a discharge mode is identified when the waveform having exceeded the threshold falls below the threshold thereafter, and an open mode is identified when the waveform having exceeded the threshold does not fall below the threshold thereafter.

Embodiment Mode 9 of the invention, based on Embodiment Mode 6 of the invention, is a wire electric discharge machine in which the inter-electrode state determination means determines the inter-electrode state in such a method that the absolute value of an inter-electrode machining voltage waveform and first and second thresholds are compared during the inter-electrode state determination period, a short-circuit mode is identified if the waveform is always less than the first or second threshold, a discharge mode is identified when the waveform having exceeded the first threshold falls below the second threshold thereafter, and an open mode is identified when the waveform having exceeded the first threshold does not fall below the first or second threshold thereafter.

Embodiment Mode 10 of the invention, based on Embodiment Mode 7 of the invention, is a wire electric discharge machine in which the inter-electrode state determination means determines the inter-electrode state in such a method that no inter-electrode state determination signals are output during the inter-electrode state determination period, the absolute value of an inter-electrode machining voltage waveform and a threshold are compared at the end of the inter-electrode state determination period, a short-circuit mode is identified if the waveform is less than the threshold, an open mode is identified if the waveform is not less than the threshold, the application of the machining voltage from the auxiliary discharge circuit to the inter-electrode gap is continued in the open mode, and a discharge mode is identified and a normal machining current equal to or higher than the short-circuit machining current is supplied from the main discharge circuit to the inter-electrode gap when the waveform falls below the threshold.

Embodiment Mode 11 of the invention, based on Embodiment Mode 7 of the invention, is a wire electric discharge machine in which the inter-electrode state determination means determines the inter-electrode state in such a method that no inter-electrode state determination signals are output during the inter-electrode state determination period, the absolute value of an inter-electrode machining voltage waveform and first and second thresholds are compared at the end of the inter-electrode state determination period, a short-circuit mode is identified if the waveform is less than the first or second threshold, an open mode is identified if the waveform is not less than the first threshold, the application of the machining voltage from the auxiliary discharge circuit to the inter-electrode gap is continued in the open mode, and a discharge mode is identified and a normal machining current equal to or higher than the short-circuit machining current is supplied from the main discharge circuit to the inter-electrode gap when the waveform falls below the second threshold.

Embodiment Mode 12 of the invention, based on any one of Embodiment Modes 1 to 11 of the invention, is a wire electric discharge machine in which the reference value for determining the discharge delay time, the inter-electrode state determination period, or the thresholds for comparison between the respective absolute values of the machining voltage waveforms are determined in advance, depending on one of or a combination of two or more of values including a wire electrode material, a wire diameter, a workpiece material, a workpiece plate thickness, and various machining condition set values.

According to the present invention, there can be provided a wire electric discharge machine having the function of improving the straightness accuracy of a thick workpiece and canceling short-circuiting caused by machining chips, thereby improving the machining efficiency and hence increasing the machining speed.

BRIEF DESCRIPTION OF THE DRAWINGS

The above and other objects and features of the present invention will be obvious from the ensuing description of embodiments with reference to the accompanying drawings, in which:

FIG. 2A is a diagram showing a state in which an inter-electrode gap is short-circuited by machining chips;

FIG. 2B is a diagram showing a state in which a discharge delay time is short;

FIG. 2C is a diagram showing a state in which the discharge delay time is long;

FIG. 4A is a conceptual diagram of the discharge delay time for a case in which a single threshold is used;

FIG. 4B is a conceptual diagram of the discharge delay time for a case in which two thresholds are used;

FIG. 5A is a conceptual diagram showing a case in which the result of inter-electrode state determination with the single threshold represents a short-circuit mode;

FIG. 5B is a conceptual diagram showing a case in which the result of the inter-electrode state determination with the single threshold represents a discharge mode;

FIG. 5C is a conceptual diagram showing a case in which the result of the inter-electrode state determination with the single threshold represents an open mode;

FIG. 6A is a conceptual diagram showing a case in which the result of inter-electrode state determination with the two thresholds represents the short-circuit mode;

FIG. 6B is a conceptual diagram showing a case in which the result of the inter-electrode state determination with the two thresholds represents the discharge mode;

FIG. 6C is a conceptual diagram showing a case in which the result of the inter-electrode state determination with the two thresholds represents the open mode;

FIG. 7A is a conceptual diagram showing a case in which the absolute value of an inter-electrode machining voltage waveform and a threshold are compared to determine an inter-electrode state and the result of the determination represents the short-circuit mode;

FIG. 7B is a conceptual diagram showing a case in which the absolute value of the inter-electrode machining voltage waveform and the threshold are compared to determine the inter-electrode state and the result of the determination represents the discharge mode;

FIG. 7C is a conceptual diagram showing a case in which the absolute value of the inter-electrode machining voltage waveform and the threshold are compared to determine the inter-electrode state and the result of the determination represents the open mode;

FIG. 7D is a conceptual diagram showing a case in which the absolute value of the inter-electrode machining voltage waveform and the threshold are compared to determine the inter-electrode state and the result of the determination represents the open mode;

FIG. 8A is a conceptual diagram showing a case in which the absolute value of an inter-electrode machining voltage waveform and two thresholds are compared to determine the inter-electrode state and the result of the determination represents the short-circuit mode;

FIG. 8B is a conceptual diagram showing a case in which the absolute value of the inter-electrode machining voltage waveform and the two thresholds are compared to determine the inter-electrode state and the result of the determination represents the discharge mode; and FIG. 8C is a conceptual diagram showing a case in which the absolute value of the inter-electrode machining voltage waveform and the two thresholds are compared to determine the inter-electrode state and the result of the determination represents the open mode.

FIG. 8D is a conceptual diagram showing a case in which the absolute value of the inter-electrode machining voltage waveform and the two thresholds are compared to determine the inter-electrode state and the result of the determination represents the open mode.

DETAILED DESCRIPTION OF THE PREFERRED EMBODIMENTS

Figure 1:
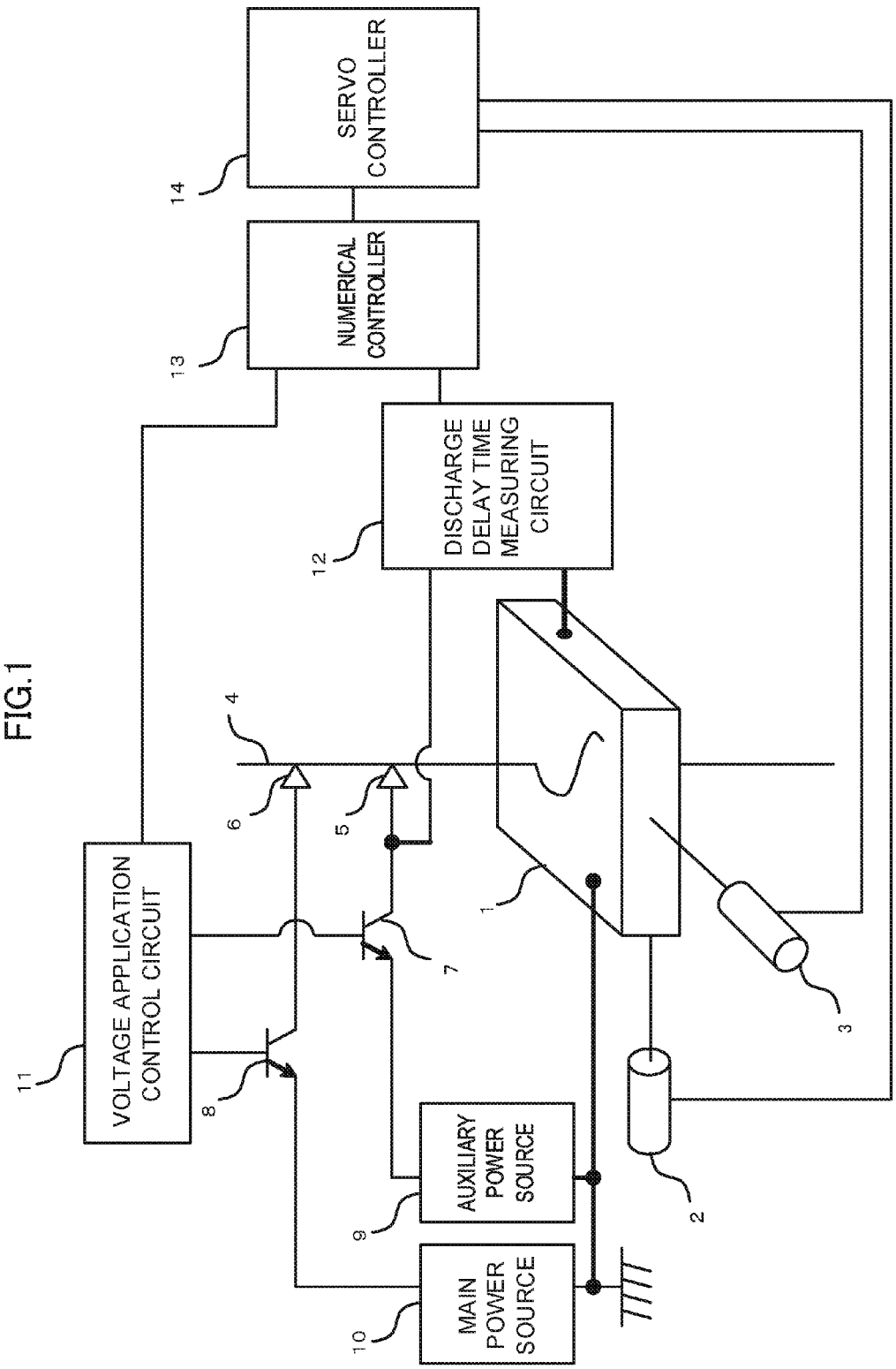
FIG. 1 is a diagram illustrating a wire electric discharge machine.

Embodiments of the present invention will now be described with reference to the accompanying drawings. FIG. 1 is a block diagram illustrating a wire electric discharge machine according to the present invention. In the present invention, a discharge delay time is used to classify the inter-electrode state into three categories; a short-circuit state, small-gap state, and large-gap state. Based on this classification, the magnitude of a machining current supplied from a main discharge circuit (comprising a main power source 10 and a switching element 8) is determined.

If the discharge delay time is zero (i.e., if no electric discharge is generated) after the lapse of a predetermined time since the start of the application of a machining voltage to an inter-electrode gap by an auxiliary discharge circuit (comprising an auxiliary power source 9 and a switching element 7), the inter-electrode gap is determined to be short-circuited by machining chips. Thereupon, a short-circuit machining current is supplied from the main discharge circuit to the inter-electrode gap to remove the machining chips. In this way, establishment of a complete short-circuit state is prevented so that the machining efficiency is improved to increase the machining speed.

When electric discharge is generated and if the discharge delay time is less than a reference value, moreover, no machining current is supplied from the main discharge circuit to the inter-electrode gap or a machining current lower than the short-circuit machining current is supplied so that the shape accuracy of the central portion of a wire at the time of thick-plate machining can be improved. When electric discharge is generated and if the discharge delay time is not less than the reference value, in contrast, the inter-electrode gap is determined to be normal, and a normal machining current equal to or higher than the short-circuit machining current is supplied from the main discharge circuit to the inter-electrode gap.

A workpiece 1 can be moved on an XY-plane by servomotors 2 and 3 mounted on a table (not shown) and configured to drive the table along orthogonal X- and Y-axes. Further, a wire electrode 4 is stretched in a direction perpendicular to the XY-plane and is designed to travel in this direction.

The auxiliary power source 9 and the main power source 10 are provided to apply a voltage between the wire electrode 4 and the workpiece 1. The auxiliary power source 9 is a power source for inducing electric discharge between the wire electrode 4 and the workpiece 1. The main power source 10 is configured to apply the machining current (or discharge current) after the electric discharge is induced. Respective one terminals of the auxiliary power source 9 and the main power source 10 are connected to the workpiece 1, and the other terminals are connected through the switching elements 7 and 8 to the wire electrode 4 by conductors 5 and 6, respectively.

The switching elements 7 and 8 are on/off-controlled by a voltage application control circuit 11. First, the switching element 7 is turned on so that a voltage for electric discharge induction is applied between the wire electrode 4 and the workpiece 1 by the auxiliary power source 9. When the electric discharge is detected by a discharge detection circuit (not shown), the switching element 8 is turned on so that the machining current is applied between the wire electrode 4 and the workpiece 1 by the main power source 10. Thereupon, the switching element 7 is turned off so that the power supply by the auxiliary power source is switched off. A method for detecting the electric discharge by the discharge detection circuit will be described later.

A discharge delay time measuring circuit 12 is configured to measure the discharge delay time, which is a duration without electric discharge such that the auxiliary power source 9 is connected between the wire electrode 4 and the workpiece 1 by the voltage application control circuit 11, switching element 7, and auxiliary power source 9 and that the machining voltage is applied from the auxiliary discharge circuit to the inter-electrode gap.

A numerical controller 13 outputs movement commands for the servomotors 2 and 3 to a servo controller 14, based on the discharge delay time, an inter-electrode average voltage value, or short-circuit, discharge, and open signals. The discharge delay time is output from the discharge delay time measuring circuit 12. The inter-electrode average voltage value is output from an inter-electrode average voltage measuring circuit (not shown) disposed between the wire electrode and the workpiece. The short-circuit, discharge, and open signals are output from an inter-electrode state determination circuit, which determines an inter-electrode state to be based on short-circuit, discharge, and open modes, according to the waveform of an inter-electrode voltage (not shown) between the wire electrode and the workpiece.

The servo controller 14 performs servo feed control such that the servomotors 2 and 3 are driven to control relative movement of the wire electrode 4 and the workpiece 1, in response to the movement commands for the servomotors 2 and 3 output from the numerical controller 13.

The configuration of the wire electric discharge machine described above is well-known in the art. The following is a description of several embodiment modes of the present invention.

In Embodiment Mode 1 of the invention, the short-circuit machining current is supplied from the main discharge circuit (comprising the main power source 10 and the switching element 8) to the inter-electrode gap (gap defined by the wire electrode 4 and the workpiece 1) if the result of measurement by the discharge delay time measuring circuit 12 is zero after the lapse of a predetermined short-circuit determination period since the start of the application of the machining voltage to the inter-electrode gap by the auxiliary discharge circuit (comprising the auxiliary power source 9 and the switching element 7). When electric discharge is generated and if the discharge delay time is less than the reference value, despite the short-circuit determination period, in contrast, no machining current is supplied from the main discharge circuit to the inter-electrode gap or a machining current lower than or equal to the short-circuit machining current is supplied. When electric discharge is generated and if the discharge delay time is not less than the reference value, despite the short-circuit determination period, moreover, a normal machining current equal to or higher than the short-circuit machining current is supplied from the main discharge circuit to the inter-electrode gap.

The inter-electrode state determination circuit may be used in place of the discharge delay time measuring means (or the discharge delay time measuring circuit 12) so that the magnitude of the machining current supplied from the main discharge circuit can be changed based on the short-circuit, discharge, and open signals output from the inter-electrode state determination circuit.

FIGS. 2A, 2B and 2C schematically represent the magnitude of the machining current applied to the inter-electrode gap if the discharge delay time is zero or if it is determined by the reference value when electric discharge is generated.

FIG. 2A shows a case in which the inter-electrode gap is short-circuited by a large number of machining chips therein. In this case, the machining chips in the inter-electrode gap can be scattered by electric discharge to restore a good inter-electrode state by positively applying the machining current, not by refraining from applying the machining current, as in the prior art case. FIG. 2B shows an example in which electric discharge is performed in a narrow-gap portion, such as the central portion of a thick-plate workpiece, the discharge delay time is short, and no machining current is supplied from the main discharge circuit to the inter-electrode gap.

In such a case, according to the present invention, as mentioned before, no machining current is supplied from the main discharge circuit to the inter-electrode gap or a machining current lower than or equal to the short-circuit machining current is supplied so that the shape accuracy of the wire central portion at the time of thick-plate machining can be improved. FIG. 2C shows an example in which electric discharge is performed in wide-gap portions, such as upper and lower edge portions of the thick-plate workpiece, and the discharge delay time is long.

Figure 3A:
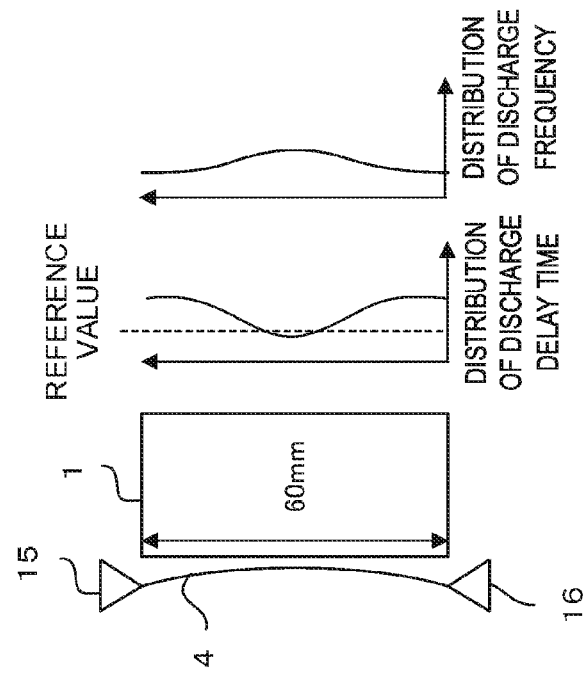
FIG. 3A is a diagram showing distributions of the discharge delay time and the discharge frequency for the case of a plate thickness of 60 mm.
Figure 3B:
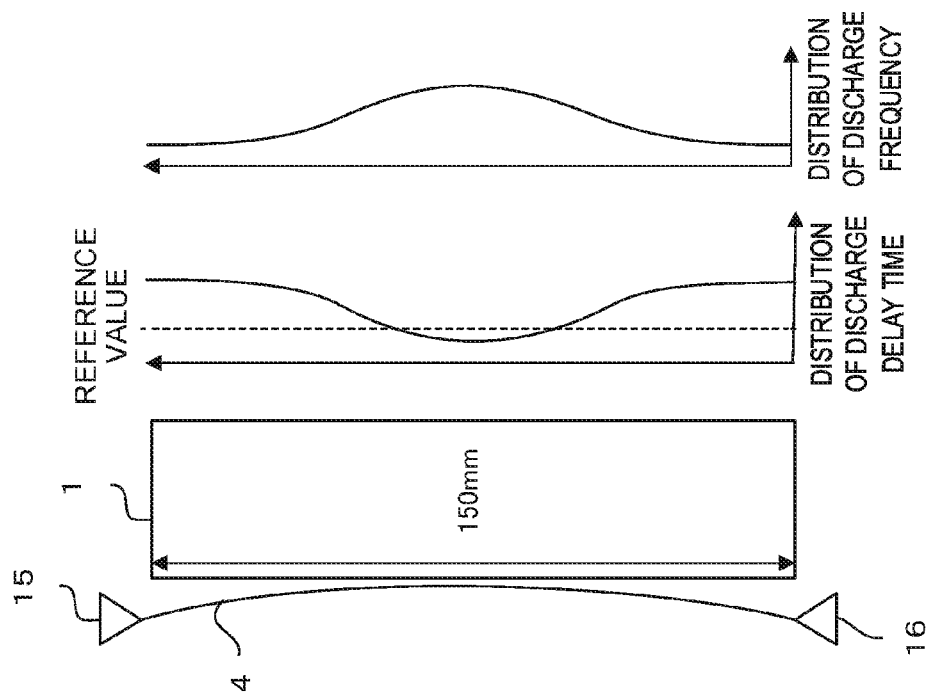
FIG. 3B is a diagram showing distributions of the discharge delay time and the discharge frequency for the case of a plate thickness of 150 mm.

FIGS. 3A and 3B show distributions of the average discharge delay time and discharge frequency obtained by an experiment when workpieces 1 with plate thicknesses of 60 mm and 150 mm were machined, respectively. The wire electrode 4 is stretched by upper and lower wire guides 15 and 16. In the experiment, a ferrous workpiece was machined by means of a brass wire with a diameter of 0.2 mm. In the central portion of the workpiece, the inter-electrode gap is narrow, so that the average discharge delay time is short and the discharge frequency rate tends to increase. In the opposite end portions of the workpiece, in contrast, the average discharge delay time is long and the discharge frequency rate tends to decrease. It can be seen that if a second reference value is subtracted from the distribution of the average discharge delay time, the average discharge delay time is not less than the reference value even in the central portion of the workpiece of 60-mm thickness, in most cases. In the case of the workpiece of 150-mm thickness, in contrast, the average discharge delay time is not more than the reference value in a wide range of the central portion.

Thus, if the machining voltage is increased even momentarily, as in the prior art, the central portion of the workpiece is excessively machined so that the straightness accuracy after machining is reduced if the machining current is applied without regard to the discharge delay time.

If the discharge delay time is not more than the reference value as in the present invention, in contrast, no machining current is supplied from the main discharge circuit to the inter-electrode gap or a machining current lower than or equal to the short-circuit machining current is supplied so that the straightness accuracy can be considerably improved. Since the supply of the machining current in the central portion of the workpiece is reduced, moreover, the machining speed can be increased.

Actually, a ferrous workpiece of 150-mm thickness was machined by means of a brass wire with a diameter of 0.2 mm. The short-circuit determination period, reference value of the discharge delay time, and short-circuit peak machining current were set to 2 μs, 5 μs, and 200 A, respectively. Machining was performed in such a manner that the machining current was not applied when the discharge delay time was less than the reference value and that the peak machining current was set to about 500 A when the discharge delay time was not less than the reference value. Thereupon, the straightness accuracy was improved from 30 μm to 10 μm and the machining speed was increased by 10%. Thus, the effect of the present invention was ascertained.

If the short-circuit state in the inter-electrode gap continues, the inter-electrode gap is not short-circuited by machining chips, but the wire electrode 4 and the workpiece 1 are in contact with each other, in some cases. If the short-circuit machining current continues to be applied in this state, the wire electrode 4 may very possibly be broken. If the wire electrode 4 is consecutively short-circuited a predetermined number of times, therefore, the application of the short-circuit machining current may be stopped or the voltage application may be interrupted for a predetermined period. When the inter-electrode average voltage is measured and if its value is not higher than a predetermined value, the application of the short-circuit machining current may be stopped based on determination that the wire electrode 4 and the workpiece 1 are in contact with each other.

The following is a description of Embodiment Modes 2 and 3 of the invention. In Embodiment Mode 2 of the invention, the measured discharge delay time is a duration in which the absolute value of the inter-electrode machining voltage waveform is not lower than a threshold. In Embodiment Mode 3 of the invention, the measured discharge delay time is a duration in which the absolute value of the inter-electrode machining voltage waveform having exceeded a first threshold falls below a second threshold.

FIG. 4A is a conceptual diagram showing a case in which a single threshold is used for the measurement of the discharge delay time (Embodiment Mode 2). Normally, the machining voltage applied to the inter-electrode gap is an AC voltage (bipolar) that serves to prevent electrolytic corrosion of the workpiece. Therefore, the discharge delay time can be obtained by calculating the absolute value of the machining voltage waveform by means of a full-wave rectifier circuit and comparing it with a threshold, thereby measuring a time during which the absolute value of the machining voltage waveform is higher than the threshold.

FIG. 4B is a conceptual diagram showing a case in which two thresholds are used for the measurement of the discharge delay time (Embodiment Mode 3). A hysteresis is provided such that a first one of the two thresholds is high and a second threshold is low. In this way, the discharge delay time can be measured without being influenced by an error or noise of an analog circuit. Appropriate detection can be achieved by setting the first threshold to about 80% of a DC supply voltage connected to the auxiliary discharge circuit and the second threshold to about 30 V, which is higher than an arc voltage (about 20 V), for example. The first and second thresholds may be set to the same value.

The following is a description of Embodiment Modes 4 and 5 of the invention. In Embodiment Mode 4 of the invention, generation of electric discharge is detected by ascertaining that the absolute value of the inter-electrode machining voltage waveform is reduced below a threshold after having exceeded it. In Embodiment Mode 5 of the invention, generation of electric discharge is detected by ascertaining that the absolute value of the inter-electrode machining voltage waveform is reduced below a second threshold after having exceeded a first threshold.

FIGS. 5A, 5B and 5C are conceptual diagrams showing how the absolute value of the inter-electrode machining voltage waveform and the threshold are compared to determine the inter-electrode state. Of these drawings, FIG. 5B shows an example of electric discharge detection. FIGS. 6A, 6B and 6C are conceptual diagrams showing how the absolute value of the inter-electrode machining voltage waveform and the first and second thresholds are compared to determine the inter-electrode state. Of these drawings, FIG. 6B shows an example of electric discharge detection.

The following is a description of Embodiment Mode 6 of the invention. In Embodiment Mode 6 of the invention, generation of electric discharge is detected by ascertaining that the discharge delay time output from the discharge delay time measuring means is more than zero and does not change for a predetermined time or that the amount of change during the predetermined time is not higher than a tolerance.

When the machining voltage is normally applied, the discharge delay time continues to be more than zero. If electric discharge is generated thereafter, the discharge delay time ceases to increase. If no electric discharge is generated, in contrast, the discharge delay time continues to increase while the machining voltage continuous to be applied. Generation of electric discharge is detected based on this situation. The electric discharge can be instantly detected by using high-speed clocks in the discharge delay time measuring circuit. If electric discharge is deemed, by using clocks of, for example, 100 MHz, to have been generated when there is no change during two clocks, the electric discharge can be detected in 20 ns. Alternatively, generation of electric discharge may be detected by ascertaining that the discharge delay time is not more than a predetermined threshold when a predetermined time has elapsed since the start of machining voltage supply from the auxiliary discharge circuit to the inter-electrode gap.

The following is a description of Embodiment Mode 7 of the invention. Inter-electrode state determination means is provided for outputting an open, discharge, or short-circuit signal, depending on an inter-electrode state during a predetermined inter-electrode state determination period, after the application of the machining voltage from the auxiliary discharge circuit to the inter-electrode gap is started. If the short-circuit signal is output from the inter-electrode state determination means, the short-circuit machining current is supplied from the main discharge circuit to the inter-electrode gap. If the discharge signal is output from the inter-electrode state determination means, no machining current is supplied from the main discharge circuit to the inter-electrode gap or a machining current lower than or equal to the short-circuit machining current is supplied. If the open signal is output from the inter-electrode state determination means, the application of the machining voltage from the auxiliary discharge circuit to the inter-electrode gap is continued. If electric discharge is generated after the inter-electrode state determination period, a normal machining current equal to or higher than the short-circuit machining current is supplied from the main discharge circuit to the inter-electrode gap.

The following is a description of a difference between Embodiment Modes 7 and 1 of the present invention. In Embodiment Mode 1 of the invention, the inter-electrode short-circuit state, small-gap state, and large-gap state are discriminated and the magnitude of the machining current applied from the main discharge circuit to the inter-electrode gap is changed based on the result of measurement by the discharge delay time measuring means. In Embodiment Mode 7 of the invention, on the other hand, the inter-electrode state determination means is used in place of the discharge delay time measuring means so that the magnitude of the machining current applied from the main discharge circuit is changed so that the magnitude of the machining current supplied from the main discharge circuit can be changed based on the short-circuit, discharge, and open signals output from the inter-electrode state determination means.

The electric discharge generated before the lapse of the inter-electrode state determination period is regarded as an electric discharge with a narrow inter-electrode gap. In this case, as in the method of Embodiment Mode 1 of the invention, no machining current is supplied from the main discharge circuit to the inter-electrode gap or a machining current lower than or equal to the short-circuit machining current is supplied. Thus, the electric discharge machine can more easily be constructed and used by collecting the two time elements, the "short-circuit determination period" and the "reference value of the discharge delay time", into one, the "inter-electrode state determination period". Since many conventional wire electric discharge machines are provided with the inter-electrode state determination means of Embodiment Mode 3 of the invention, moreover, even wire electric discharge machines without the discharge delay time measuring means can easily be introduced.

The following is a description of Embodiment Mode 8 of the invention. As a method of inter-electrode state determination by the inter-electrode state determination means, the absolute value of the inter-electrode machining voltage waveform and the threshold are compared during the inter-electrode state determination period. The short-circuit mode is identified if the waveform is always less than the threshold. The discharge mode is identified when the waveform having exceeded the threshold falls below it thereafter. The open mode is identified when the waveform having exceeded the threshold does not fall below it thereafter. FIGS. 5A, 5B and 5C are conceptual diagrams showing how the absolute value of the inter-electrode machining voltage waveform and the threshold are compared to determine the inter-electrode state.

The following is a description of Embodiment Mode 9 of the invention. As a method of inter-electrode state determination by the inter-electrode state determination means, the absolute value of the inter-electrode machining voltage waveform and the first and second thresholds are compared during the inter-electrode state determination period. The short-circuit mode is identified if the waveform is always less than the first or second threshold. The discharge mode is identified when the waveform having exceeded the first threshold falls below the second threshold thereafter. The open mode is identified when the waveform having exceeded the first threshold does not fall below the first or second threshold thereafter. A hysteresis is provided such that the first threshold is higher than the second threshold. In this way, a state in which the inter-electrode gap is sufficiently wide and the electric discharge is normal can be detected without being influenced by an error or noise of an analog circuit.

Appropriate detection can be achieved by setting the first threshold to about 80% of the DC supply voltage connected to the auxiliary discharge circuit and the second threshold to about 30 V, which is higher than the arc voltage (about 20 V), for example. The first and second thresholds may be set to the same value. FIGS. 6A, 6B and 6C are conceptual diagrams showing how the absolute value of the inter-electrode machining voltage waveform and the first and second thresholds are compared to determine the inter-electrode state.

The following is a description of Embodiment Mode 10 of the invention. As a method of inter-electrode state determination by the inter-electrode state determination means, no inter-electrode state determination signals are output during the inter-electrode state determination period, and the absolute value of the inter-electrode machining voltage waveform and the threshold are compared at the end of the inter-electrode state determination period. The short-circuit mode is identified if the waveform is less than the threshold. The open mode is identified if the waveform is not less than the threshold. In the open mode, the application of the machining voltage from the auxiliary discharge circuit to the inter-electrode gap is continued. When the waveform falls below the threshold, the discharge mode is identified, and a normal machining current equal to or higher than the short-circuit machining current is supplied from the main discharge circuit to the inter-electrode gap. FIGS. 7A, 7B, 7C and 7D are conceptual diagrams showing how the absolute value of the inter-electrode machining voltage waveform and the threshold are compared to determine the inter-electrode state.

The following is a description of Embodiment Mode 11 of the invention. As a method of inter-electrode state determination by the inter-electrode state determination means, no inter-electrode state determination signals are output during the inter-electrode state determination period, and the absolute value of the inter-electrode machining voltage waveform and the first and second thresholds are compared at the end of the inter-electrode state determination period. The short-circuit mode is identified if the waveform is less than the first or second threshold. The open mode is identified if the waveform is not less than the first threshold. In the open mode, the application of the machining voltage from the auxiliary discharge circuit to the inter-electrode gap is continued. When the waveform falls below the second threshold, the discharge mode is identified, and a normal machining current equal to or higher than the short-circuit machining current is supplied from the main discharge circuit to the inter-electrode gap. As in Embodiment Mode 9, a hysteresis is provided such that the first threshold is higher than the second threshold. In this way, a state in which the inter-electrode gap is sufficiently wide and the electric discharge is normal can be detected without being influenced by an error or noise of an analog circuit.

Appropriate detection can be achieved by setting the first threshold to about 80% of the DC supply voltage connected to the auxiliary discharge circuit and the second threshold to about 30 V, which is higher than the arc voltage (about 20 V), for example. The first and second thresholds may be set to the same value. FIGS. 8A, 8B, 8C and 8D are conceptual diagrams showing how the absolute value of the inter-electrode machining voltage waveform and the first and second thresholds are compared to determine the inter-electrode state.

The following is a description of Embodiment Mode 12 of the invention. The reference value for determining the discharge delay time described in Embodiment Mode 1 of the invention, the inter-electrode state determination period described in Embodiment Mode 6 of the invention, or the thresholds for comparison between the respective absolute values of the machining voltage waveforms described in Embodiment Modes 2 to 6 and Embodiment Modes 8 to 11 of the invention are determined in advance, depending on one of or a combination of two or more of values including a wire electrode material, wire diameter, workpiece material, workpiece plate thickness, and various machining condition set values. Since the shape of the wire during machining is transferred to the workpiece, as mentioned before, it is necessary to predetermine the reference value for determining the discharge delay time, the inter-electrode state determination period, and the thresholds for comparison between the respective absolute values of the machining voltage waveforms, depending on elements that influence the wire shape. For example, the values may be set in accordance with the workpiece plate thickness alone or with a combination of two or more elements, such as the combination of the wire diameter and the workpiece plate thickness. The machining condition set values include a machining power supply voltage set value, machining current application time set value, machining downtime set value, and machining water volume set value. A combination with these set values may also be used for the setting.

While embodiments of the present invention have been described herein, the invention is not limited to the above-described embodiments and may be suitably modified and embodied in various forms.

The invention claimed is:

1. A wire electric discharge machine which comprises an auxiliary discharge circuit, configured to apply a voltage to an inter-electrode gap between an electrode and a workpiece, thereby inducing electric discharge, and a main discharge circuit configured to supply a machining current, and machines the workpiece by repeating a cycle in which the main discharge circuit is activated and stopped after the auxiliary discharge circuit is activated, the wire electric discharge machine comprising:

a discharge delay time measuring unit configured to measure a discharge delay time, which is a duration without electric discharge such that a machining voltage is applied from the auxiliary discharge circuit to the inter-electrode gap, wherein a short-circuit machining current is supplied from the main discharge circuit to the inter-electrode gap when a result of measurement by the discharge delay time measuring unit is zero after a lapse of a predetermined short-circuit determination period since a start of an application of the machining voltage to the inter-electrode gap by the auxiliary discharge circuit, no machining current is supplied from the main discharge circuit to the inter-electrode gap or a machining current lower than or equal to the short-circuit machining current is supplied when electric discharge is generated and the discharge delay time is less than a reference value after the short-circuit determination period, a normal machining current equal to or higher than the short-circuit machining current is supplied from the main discharge circuit to the inter-electrode gap when electric discharge is generated and the discharge delay time is not less than the reference value after the short-circuit determination period, and the machining current applied to the inter-electrode gap when electric discharge is generated and the discharge delay time is less than the reference value after the short-circuit determination period, is lower than the normal machining current applied to the inter-electrode gap when electric discharge is generated and the discharge delay time is not less than the reference value after the short-circuit determination period.

2. The wire electric discharge machine according to claim 1, wherein the discharge delay time measuring unit measures a duration in which the absolute value of an inter-electrode machining voltage waveform is not lower than a threshold.

3. The wire electric discharge machine according to claim 1, wherein the discharge delay time measuring unit measures a duration in which the absolute value of an inter-electrode machining voltage waveform having exceeded a first threshold falls below a second threshold.

4. The wire electric discharge machine according to claim 1, wherein unit for detecting generation of the electric discharge detects the electric discharge when the absolute value of the inter-electrode machining voltage waveform having exceeded a threshold falls below the threshold.

5. The wire electric discharge machine according to claim 1, wherein unit for detecting generation of the electric discharge detects the electric discharge when the absolute value of the inter-electrode machining voltage waveform having exceeded a first threshold falls below a second threshold.

6. The wire electric discharge machine according to claim 1, wherein unit for detecting generation of the electric discharge detects the electric discharge if the discharge delay time output from the discharge delay time measuring unit is more than zero and does not change for a predetermined time or if the amount of change during the predetermined time is not higher than a tolerance.

7. A wire electric discharge machine which comprises an auxiliary discharge circuit, configured to apply a voltage to an inter-electrode gap between an electrode and a workpiece, thereby inducing electric discharge, and a main discharge circuit configured to supply a machining current, and machines the workpiece by repeating a cycle in which the main discharge circuit is activated and stopped after the auxiliary discharge circuit is activated, the wire electric discharge machine comprising:
an inter-electrode state determination unit configured to output an open, discharge, or short-circuit signal, depending on an inter-electrode state during a predetermined inter-electrode state determination period, after an application of a machining voltage from the auxiliary discharge circuit to the inter-electrode gap is started,
wherein
a short-circuit machining current is supplied from the main discharge circuit to the inter-electrode gap when the short-circuit signal is output from the inter-electrode state determination unit,
no machining current is supplied from the main discharge circuit to the inter-electrode gap or a machining current lower than or equal to the short-circuit machining current is supplied when the discharge signal is output from the inter-electrode state determination unit,
the application of the machining voltage from the auxiliary discharge circuit to the inter-electrode gap is continued when the open signal is output from the inter-electrode state determination unit, and
a normal machining current equal to or higher than the short-circuit machining current is supplied from the main discharge circuit to the inter-electrode gap when electric discharge is generated after the inter-electrode state determination period, and
the machining current applied to the inter-electrode gap when the discharge signal is output from the inter-electrode state determination unit is lower than the machining current applied to the inter-electrode gap when the open signal is output from the inter-electrode state determination unit and when electric discharge is generated after the inter-electrode state determination period.

8. The wire electric discharge machine according to claim 7, wherein the inter-electrode state determination unit is configured to
compare the absolute value of an inter-electrode machining voltage waveform and a threshold during the inter-electrode state determination period, and
determine the inter-electrode state as
a short-circuit mode, in response to the waveform being always less than the threshold,
a discharge mode, in response to the waveform having exceeded the threshold and falling below the threshold thereafter, and
an open mode, in response to the waveform having exceeded the threshold without falling below the threshold thereafter.

9. The wire electric discharge machine according to claim 7, wherein the inter-electrode state determination unit is configured to
compare the absolute value of an inter-electrode machining voltage waveform and first and second thresholds during the inter-electrode state determination period, and
determine the inter-electrode state as
a short-circuit mode, in response to the waveform being always less than the first or second threshold,
a discharge mode, in response to the waveform having exceeded the first threshold and falling below the second threshold thereafter, and
an open mode, in response to the waveform having exceeded the first threshold without falling below the first or second threshold thereafter.

10. The wire electric discharge machine according to claim 7, wherein the inter-electrode state determination unit is configured to
output no inter-electrode state determination signals during the inter-electrode state determination period,
compare the absolute value of an inter-electrode machining voltage waveform and a threshold at the end of the inter-electrode state determination period, and
determine the inter-electrode state as
a short-circuit mode, in response to the waveform being less than the threshold,
an open mode, in response to the waveform being not less than the threshold, wherein the application of the machining voltage from the auxiliary discharge circuit to the inter-electrode gap is continued in the open mode, and
a discharge mode, in response to the waveform falling below the threshold, wherein the normal machining current equal to or higher than the short-circuit machining current is supplied from the main discharge circuit to the inter-electrode gap.

11. The wire electric discharge machine according to claim 7, wherein the inter-electrode state determination unit is configured to
output no inter-electrode state determination signals during the inter-electrode state determination period,
compare the absolute value of an inter-electrode machining voltage waveform and first and second thresholds at the end of the inter-electrode state determination period, and
determine the inter-electrode state as
a short-circuit mode, in response to the waveform being less than the first or second threshold,
an open mode, in response to the waveform being not less than the first threshold, wherein the application of the machining voltage from the auxiliary discharge circuit to the inter-electrode gap is continued in the open mode, and
a discharge mode, in response to the waveform falling below the second threshold, wherein the normal machining current equal to or higher than the short-circuit machining current is supplied from the main discharge circuit to the inter-electrode gap.

12. The wire electric discharge machine according to claim 1, wherein the reference value for determining the discharge delay time, the inter-electrode state determination period, or the thresholds for comparison between the respective absolute values of the machining voltage waveforms are determined in advance, depending on one of or a combination of two or more of values including a wire electrode material, a wire diameter, a workpiece material, a workpiece plate thickness, and various machining condition set values.

* * * * *